(12) United States Patent
Immonen et al.

(10) Patent No.: US 8,341,196 B2
(45) Date of Patent: Dec. 25, 2012

(54) METHOD AND APPARATUS FOR CREATING A CONTEXTUAL MODEL BASED ON OFFLINE USER CONTEXT DATA

(75) Inventors: Pekka Immonen, Lepsämä (FI); Jarkko Heinonen, Berlin (DE)

(73) Assignee: Nokia Corporation, Espoo (FI)

( * ) Notice: Subject to any disclaimer, the term of this patent is extended or adjusted under 35 U.S.C. 154(b) by 318 days.

(21) Appl. No.: 12/624,304

(22) Filed: Nov. 23, 2009

(65) Prior Publication Data
US 2011/0125744 A1   May 26, 2011

(51) Int. Cl.
*G06F 17/00* (2006.01)
(52) U.S. Cl. ........ 707/807; 707/688; 707/790; 707/792; 707/781
(58) Field of Classification Search .................. 707/688, 707/790, 792, 781, 807
See application file for complete search history.

(56) References Cited

U.S. PATENT DOCUMENTS

| | | | |
|---|---|---|---|
| 2002/0073088 A1 | 6/2002 | Beckmann et al. | |
| 2003/0083938 A1 | 5/2003 | Smith et al. | |
| 2008/0004884 A1 | 1/2008 | Flake et al. | |
| 2008/0005313 A1 | 1/2008 | Flake et al. | |
| 2008/0243531 A1 | 10/2008 | Hyder et al. | |
| 2008/0270233 A1 | 10/2008 | Yip et al. | |
| 2009/0012925 A1 | 1/2009 | Brown | |
| 2009/0271244 A1 | 10/2009 | Kalasapur et al. | |
| 2010/0070448 A1* | 3/2010 | Omoigui | 706/47 |
| 2010/0125605 A1 | 5/2010 | Nair et al. | |

OTHER PUBLICATIONS

Office Action for U.S. Appl. No. 12/624,004 dated Dec. 2, 2011, pp. 1-12.
Office Action for related U.S. Appl. No. 12/624,004 dated Jun. 28, 2012, pp. 1-12.

* cited by examiner

*Primary Examiner* — Sana Al Hashemi
(74) *Attorney, Agent, or Firm* — Ditthavong Mori & Steiner, P.C.

(57) ABSTRACT

An approach is provided for providing a contextual model based upon user context data. A context modeling platform collects context data on offline activities of a user. The context modeling platform maps the collected user context data as context data points into a multidimensional contextual model. The context modeling platform causes, at least in part, actions that result in reception of at least one multidimensional contextual model of another user. The context modeling platform compares the multidimensional contextual model of the user with the multidimensional contextual model of the another user.

17 Claims, 18 Drawing Sheets

200

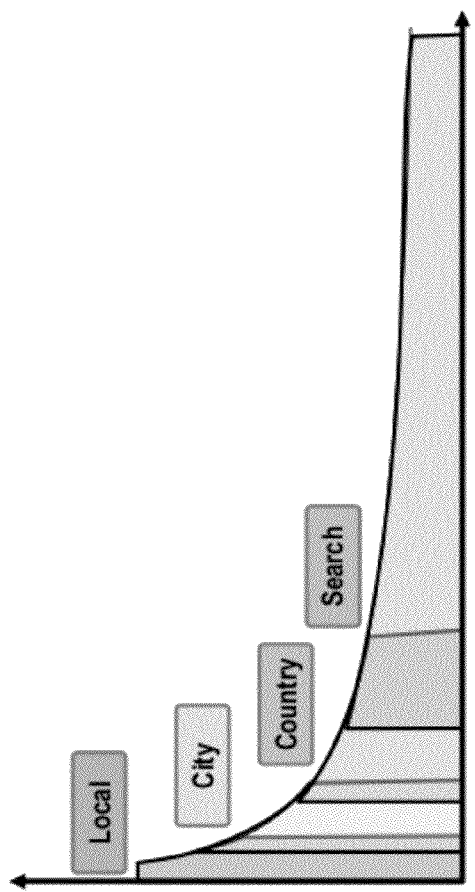
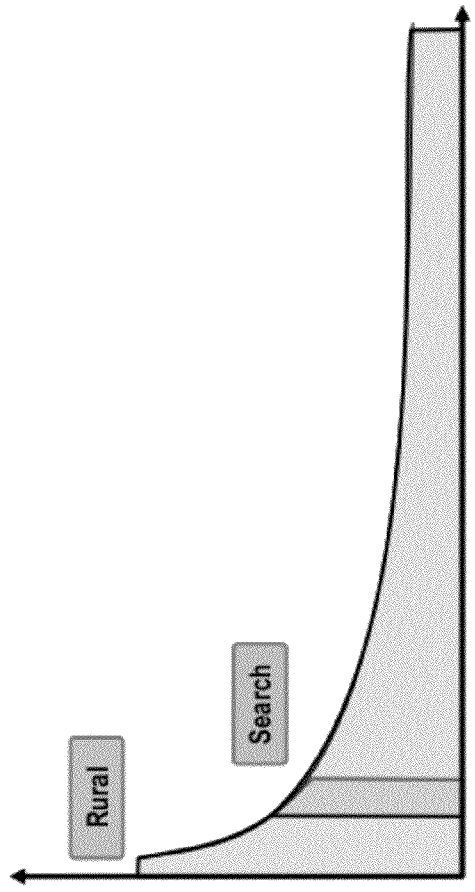
FIG. 10A
FIG. 10B

US 8,341,196 B2

METHOD AND APPARATUS FOR CREATING A CONTEXTUAL MODEL BASED ON OFFLINE USER CONTEXT DATA

BACKGROUND

Service providers (e.g., wireless, cellular, Internet, content, social network, etc.) and device manufacturers are continually challenged to deliver value and convenience to consumers by, for example, offering efficient search results for topics, points of interest, etc. One area of interest has been the development of services and technologies for customizing online search results that is specific to the user (e.g., data that are presented for personal needs yet infused with group preferences). More specifically, web services have access to vast stores of online information related to different users at a variety of regional scopes (e.g., country, city, community, etc.). However, at times (e.g., when a user has yet build an online history), online information is not readily available to assist in customizing a user's online experience. As a result, the information available for searching often greatly exceeds the capability of the device to conduct the searches. Accordingly, service providers and device manufacturers are challenged to develop new mechanisms for customizing and accelerating searches to extract, highlight, and display those points of interests and related information that are most relevant to a particular user's search entries when online data about user or user group preferences are not available.

Some Example Embodiments

Therefore, there is a need for an approach for providing a contextual model based upon offline user context data.

According to one embodiment, a method comprises collecting context data on offline activities of a user. The method also comprises mapping the collected context data as context data points into a multidimensional contextual model. The method further comprises causing, at least in part, actions that result in reception of at least one multidimensional contextual model of another user. The method further comprises comparing the multidimensional contextual model of the user with the multidimensional contextual model of the another user.

According to another embodiment, an apparatus comprising at least one processor, and at least one memory including computer program code, the at least one memory and the computer program code configured to, with the at least one processor, cause, at least in part, the apparatus to collect context data on offline activities of a user. The apparatus is also caused to map the collected context data as context data points into a multidimensional contextual model. The apparatus is further caused to cause, at least in part, actions that result in reception of at least one multidimensional contextual model of another user. The apparatus is further caused to compare the multidimensional contextual model of the user with the multidimensional contextual model of the another user.

According to another embodiment, a computer-readable storage medium carrying one or more sequences of one or more instructions which, when executed by one or more processors, cause, at least in part, an apparatus to collect context data on offline activities of a user. The apparatus is also caused to map the collected context data as context data points into a multidimensional contextual model. The apparatus is further caused to cause, at least in part, actions that result in reception of at least one multidimensional contextual model of another user. The apparatus is further caused to compare the multidimensional contextual model of the user with the multidimensional contextual model of the another user.

According to another embodiment, an apparatus comprises means for collecting context data on offline activities of a user. The apparatus also comprises means for mapping the collected context data as context data points into a multidimensional contextual model. The apparatus further comprises means for causing, at least in part, actions that result in reception of at least one multidimensional contextual model of another user. The apparatus further comprises means for comparing the multidimensional contextual model of the user with the multidimensional contextual model of the another user.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 10A-10B are diagrams of an example of how context data of different location levels are adjusted, according to one embodiment;

DESCRIPTION OF SOME EMBODIMENTS

Examples of a method, apparatus, and computer program for providing a contextual model based upon offline user context data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
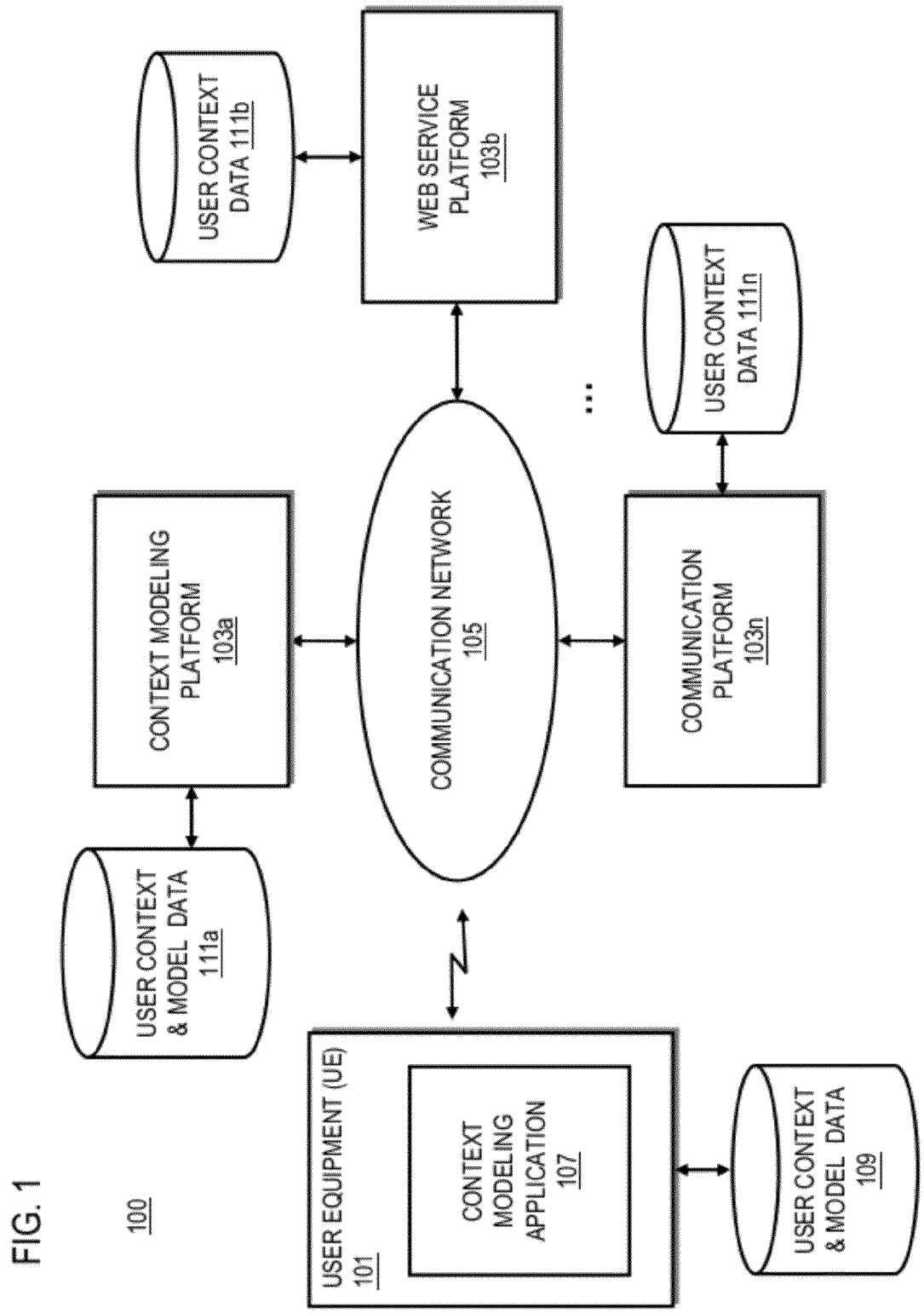
FIG. 1 is a diagram of a system capable of providing a contextual model based upon offline user context data, according to one embodiment.

FIG. 1 is a diagram of a system capable of providing a contextual model based upon user context data, according to one embodiment. As used herein, the term 'contextual model' refers to mapping of discrete context data of a user offline activities (e.g., physical visits to a point of interest, calling history, etc.), user online entries (e.g., blogs, message forums, social networking sites) and/or online interactions to record and reflect user preferences or dislikes. In an effort to organize the user context data, the contextual model is inserted with instances and events that contain possible relationships that are discoverable via, for instance, data-mining or other querying processes. By way of example, the contextual model allows examining and data-mining for characteristics and features of an individual user's context data and/or context data associated with a group of users. Knowledge of individual and group preferences can be accumulated by assimilating features of the distal and proximal contexts.

It is noted that traditional web search engines are designed to search for information on the Internet, and to present the search results in a list of web pages, images, videos, and other types of files. Some search engines also mine user entries and data available in public and/or private databases. Moreover, the traditional search process is highly dependent on the skill and familiarity a user has with a particular search engine. In other words, users of different levels of searching skills typically get different search results. For example, to filter out unwanted information, a user generally would have to manually specify search criteria and/or preferences. To get more precise results, the user enters preferences and options (e.g., categories of points of interests to display, detail, etc.) which takes time and requires significant user input or skill. With focused search phrases, the search results are more likely to include what the user was looking for. Even experienced users have to enter searching phrases on a trial-and-error basis to get better ideas regarding what options are available and may be of interest. Frequently, only parts of the search results may be of interest to the user. A user may be discouraged from or may find it difficult to specify the search phrases to get desired information (e.g., topics, points of interest, locations, etc.). This is especially true for searching information that is locally significant. Due to its local and niche nature, the locally significant information is not widely searched thus buried deep in the search result list and hard for the user to get to. Conventional data mining, for instance, extracts local points of interest mainly from data related to user online activities. However, as discussed previously, the information on online activities may not always be available (e.g., when a network connection is lost, when the user has no online profile, etc.).

Figure 2:
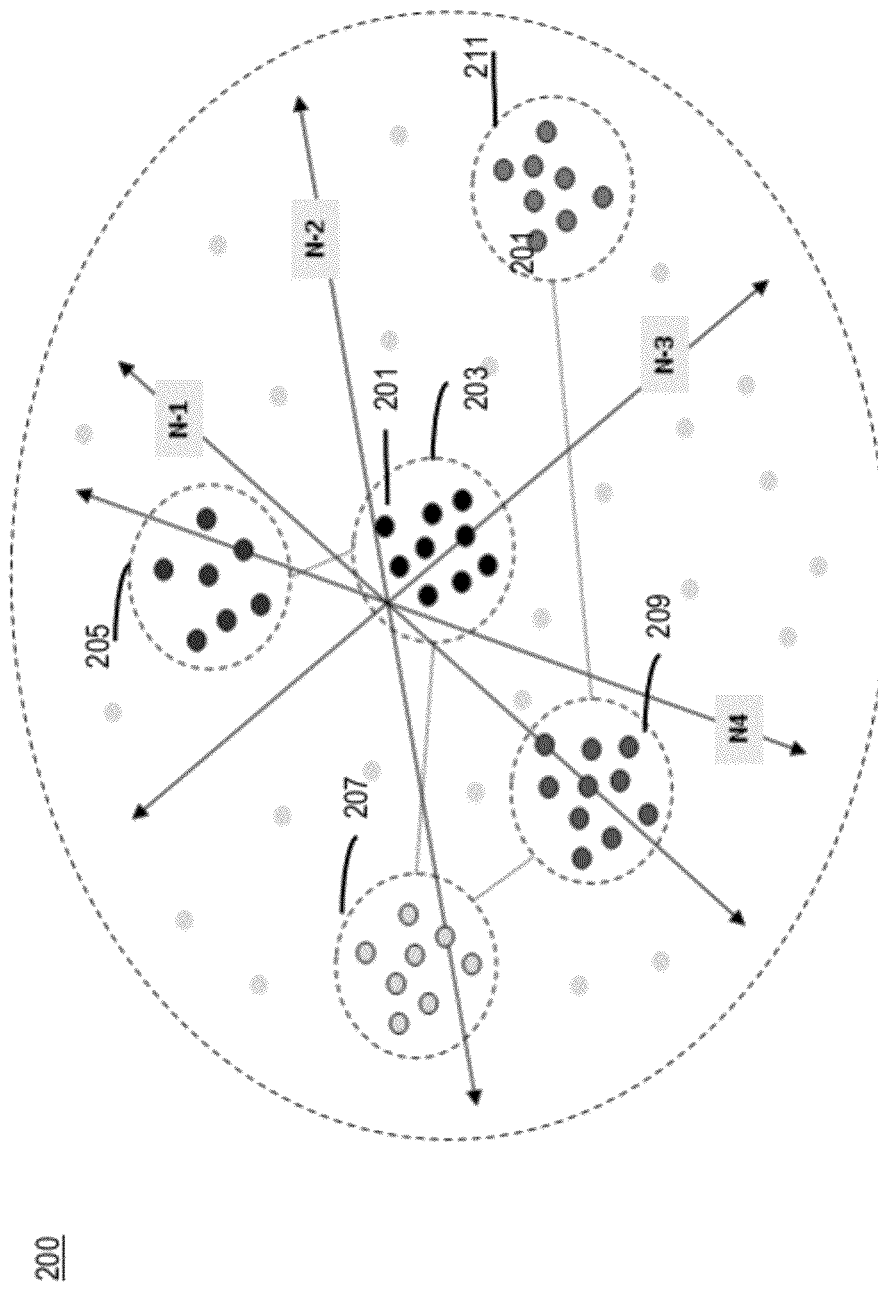
FIG. 2 is a diagram of the conceptual model capable of recording user context data, according to one embodiment.

To address these problems, the system 100 introduces a contextual model to automatically record context data of user online interactions and related activities with respect to specific topics, points of interests, or locations into a multidimensional space that constitutes the contextual model. FIG. 2 is a diagram of the conceptual model capable of recording user context data, according to one embodiment. The system 100 discovers user characteristics and preferences by clustering the data points in the contextual model 200, and matches a user query with the clusters. The system 100 maps a user search query into the contextual model, and finds the clusters of information (e.g., one or more topics, points of interest, location, etc.) matched with the query within the contextual model as the best matched user information with respect to the query. In this way, the system 100 customizes a list of search results for the user based on the determined clusters. Such a topic, point of interest, location, or site can be a physical or a virtual one. For example, a physical location can be a nightclub, a zoo, a landmark, etc. A virtual location exists, for instance, electronically in a computer-based simulated environment, such as a computer game, Second Life® or the like. In one embodiment, instead of displaying all information in a search result list, the system 100 creates and displays limited numbers of entries that are relevant for the user. This can more effectively utilize resources (e.g., available display area, processing resources, etc.) available on user terminals with limited capabilities (e.g., portable handset, smartphone, mobile terminal, etc.).

The system 100 assists users to gain more contextual awareness by finding relevant and valid information. By way of example, this kind of assistance could be used in contextual aware applications running on a mobile computing device for a personal navigation application. Users of such an application often in situations where any assistance may radically decrease the mental payload and thus significantly improve the user experience. Typical interactions where assistance may be needed include typing, information browsing, searching information, etc.

In addition, users may be interested in utilizing the contextual models generated for or by other users (e.g., friends, social networking contacts, etc.) that show unique tacit knowledge and interests of physical locations of other users. Therefore, in another embodiment, the system 100 aggregates the information collected about users of a user group to generate a group contextual model. The group may be defined by the user or by heuristic analysis of, for instance, the user's contacts (e.g., contacts stored on the user's mobile device, social networking contacts, etc.). For example, pastry chef conference attendees exchange their contextual models of restaurants and sight-seeing spots, to assemble a tour itinerary considering their different preferences, perspectives and knowledge of the local areas.

By way of example, it is contemplated that the system 100 uses any mechanism to collect data on a user with respect to a topic, point of interest or location. For example, the system 100 automatically tracks the number of times a user visits a website, blog, forum of a particular topic, etc. or searches online for a point of interest or location (e.g., a nightclub), etc. Moreover, the system 100 evaluates the communication content (e.g., text messages, e-mails, audio messages, etc.) on the user's device to determine whether specific phrases tied to points of interests or locations. For example, the user may have a text message stating "I love the Greek Islands." The system 100 interprets this message as a higher level of interest in the Greek history, etc. The system 100 then determines a level of interest based on the number of visits to relevant web resources (e.g., level of interest increases with the number of visits detected). In addition or alternatively, the system 100 collects context data on the user based on "physical visits" to the topic, point of interest or location. For example, the system 100 tracks the number of times the user physically visits a particular meeting/conference, point of interest or location (e.g., a nightclub) using location based services (e.g., GPS navigation and/or tracking, cellular triangulation), location markers or beacons at specific locations (e.g., radio frequency identification (RFID) tags, Bluetooth communication, WLAN communication), biometric reading (e.g., facial recognition via security cameras). In another embodiment, the system 100 processes the media present on a user's device to determine the number photos or videos related to a particular topic, point of interest or location. This information is available, for instance, in media that have been tagged with the topic, point of interest or location information.

Although various embodiments are described as follows with respect to a geographic data for rendering points of interest or locations, it is contemplated that the approach described herein may be used with multi-dimensional context data, such as entertainment, travel, health, sports, personal finance, career, relationships and hobbies, etc.

As shown in FIG. 1, the system 100 comprises a user equipment (UE) 101 having connectivity to a context modeling platform 103a, a web service platform 103b, and a communication platform 103n via a communication network 105. The context modeling platform 103a builds a contextual model based upon the above-discussed user context data. For example, the contextual model of a computer geek contains information of intellectuality, electronics, wireless hot spots in the city, computer conventions in the US, forums of technologies, computing and new media, etc. The web service platform 103b collects, assembles, stores, updates, and supplies user context data. The communication platform 103n processes user context data of different formats including, emails, SMS, etc. Each of the platforms 103a-103n and the UE 101 are connected to their own databases to access particular types of data related to the execution of their respective functions. The context modeling platform 103a is connected to a user context and model database 111a, the web service platform 103b is connected to a user context database 111b, the communication platform 103n is connected to a user context database 111n, and the UE 101 is connected to a user context and model database 109.

The context modeling platform 103a, the web service platform 103b, and the communication platform 103n can be implemented via shared or partially shared hardware equipment or different hardware equipment. For the purposes of illustration, the system 100 is explained with respect to the use of a multidimensional (e.g., four dimensional) contextual model. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the context modeling platform 103a, the web service platform 103b, and the communication platform 103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The multidimensional model is computed by utilizing data items/entities from various sources, such as the web service platform 103b, the communication platform 103n, etc. Each piece of data is mapped as coordinates into the multidimensional model and is considered as a contextual item or entity. A contextual entity can be anything that can be expressed as coordinates, such as a user, point of interest, address or landmark. The coordinates may be mathematic coordinates, geographic coordinates, etc. By way of example, the system 100 applies a latitude-longitude coordinate system or a Cartesian coordinate system. The coordinates do not have to be physical or conceptual coordinates.

By way of example, the system 100 applies a Euclidean plane/space as shown in FIG. 2 to the contextual model 200 with the dimensions including at least a location dimension N1, a time dimension N2, a personal dimension N3, and a social dimension N4. In mathematics, a Euclidean space is the Euclidean plane and multidimensional space of Euclidean geometry. The model 200 can be increasingly detailed for each of the dimensions. By way of example, the location dimension N1 expresses a physical location, a map location, and a zoom level, etc. The time dimension N2 expresses periodic patterns, events, latest trends of user online and/or real world activities, etc. The personal dimension N3 expresses preferences, tastes of like-minded users and tribes, etc. The social dimension N4 expresses ongoing social communication context, with whom the user is now, etc. R denotes the field of real numbers. For any non-negative integer n, the space of all n-tuples of real numbers forms a multidimensional vector space over R, which is denoted Rn. An element of Rn is written as:

$$X=(x1,x2,x3,\ldots,xn)$$

where each xi is a real number.

The vector space operations on Rn are defined by:

$$X+Y=(x1+y1, x2+y2, x3+y3, \ldots, xn+yn)$$

Rn is the prototypical example of a real multidimensional vector space. In fact, every real multidimensional vector space V is isomorphic to Rn. Similar entities in the contextual model 200 are grouped by applying clustering techniques. For example, contextual clustering puts search results into sequences based on locations and times. When a user searches for information, the system 100 suggests the word from the first character input by user, and the suggested word is selected from recognized contextual cluster data.

The distances (e.g., Euclidean distances) between entities stored into the model 200 can be calculated. The contextual model can be further improved by introducing a weighting mechanism relying on a weighting model computed from transaction logs.

Figure 3:
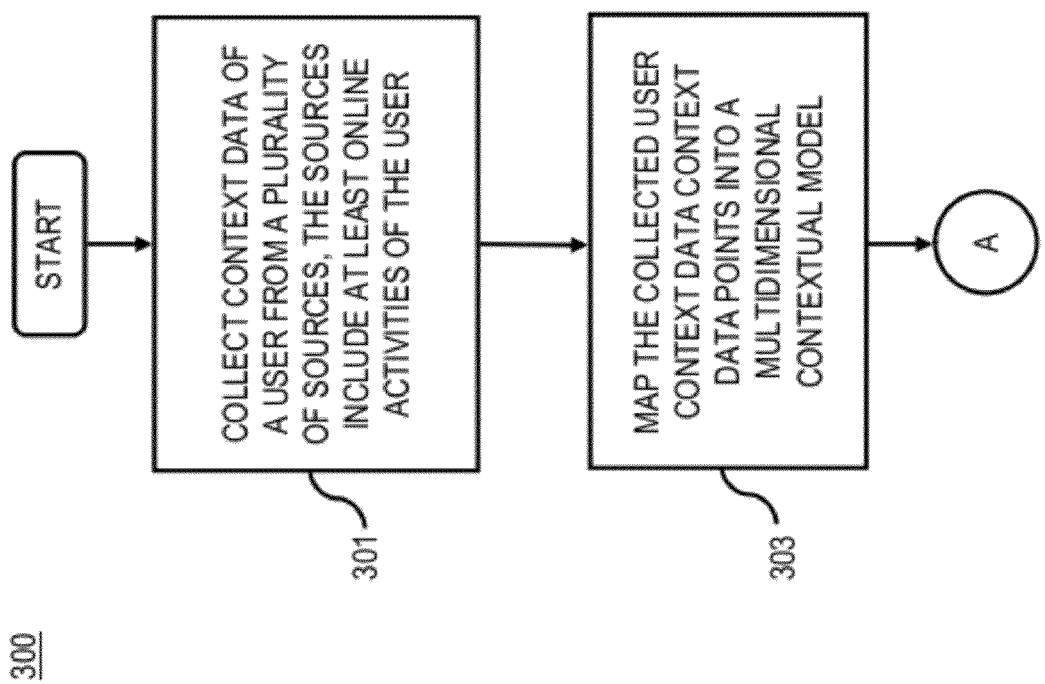
FIG. 3 is a flowchart of a process for providing a contextual model, according to one embodiment.
Figure 15:
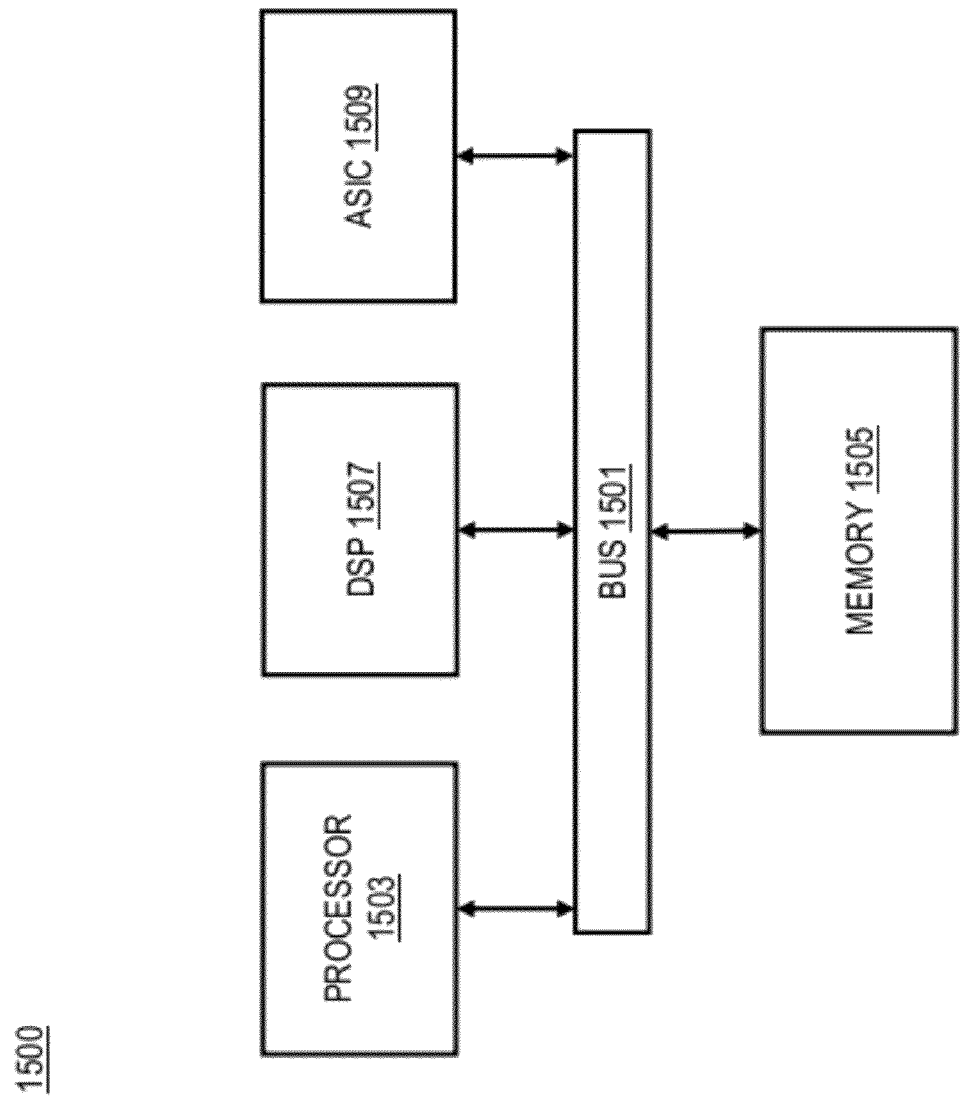
FIG. 15 is a diagram of a chip set that can be used to implement an embodiment of the invention.

FIG. 3 is a flowchart of a process 300 for modeling user context data, according to one embodiment. In one embodiment, the context modeling platform 103a performs the process 300 and is implemented in, for instance, a chip set including a processor and a memory as shown in FIG. 15. In step 301, the context modeling platform 103a collects context data of a user from a plurality of sources. There are different ways to collect various types of user context data, such as user online search entries, data mining via the user's physical as well as online behaviors, activities, social networks, census, marketing survey, user profiling, etc. The user online activities at least include: (1) browsing by a user via Internet a resource that is related to the point of interest (for example, a restaurant in a certain nightclub and its menu); (2) viewing by the user webcams transmitting video from inside the nightclub or towards the nightclub; (3) online media items (articles, music, video, photos, etc. posted in blogs on web pages, etc.) created by the user regarding the nightclub; (4) online articles, music, video, photos, etc. captured by the user regarding the nightclub, etc.

The context modeling platform 103a maps user context data into the multidimensional contextual model 200 (Step 303). The context modeling platform 103a data-mines and learns user characteristics by observing and analyzing user context data recorded in the contextual model 200 via different techniques, such as classification, clustering, regression, association rule learning, etc. Any user online and real-world actions/activities which are detected or tracked are interpreted as an expression of user interests and/or needs. The tracked/collected information is further analyzed and normalized into the contextual model 200 as a feature vector.

Taking one user's online search for a nightclub in Mitte, Berlin as an example, the context modeling platform 103a maps the location of the nightclub x1 (e.g., a street address), the time of entering the search x2 (e.g., Nov. 7. 2009, 10:00 pm), the personal preference for the nightclub x3 (e.g., a live salsa band), the social context x4 (e.g., singles of ages in the 30s), . . . , xn into the multidimensional contextual model 200 as a point 201 expressed as a vector (x1, x2, x3, . . . , xn). The location of the nightclub x1 can also be described in a map and with different zoom levels. The time of entering the search x2 can also be described as in periodic patterns (e.g., Wednesday lady free nights), events (e.g., laser light shows, single night, Christmas parties, etc.), and latest trends (e.g., dance schools), etc. The personal preferences for the nightclub x3 can be described as music genres, lighting, food and liquor menus, smoking restrictions, dress code, etc. The social context x4 can be described as ethnic backgrounds, ages, male/female ratios of the clubbers, people whom the user invited to go, and people with whom the user communicated or is communicating with regarding the nightclub, etc.

Contextual models are used to represent complex relationships between same and different kinds of entities with any numbers of dimensions. Any one of the dimensions can be replaced by other dimensions. The location dimension x1 is important for corresponding entities in the model 200 into real world concrete locations, and most users' searches and choices are influenced and constrained by geographic locations. Nevertheless, in other embodiments, contextual models are built without the location dimension x1. For example, in an online gaming setting, the players are not concerned with where other players are physically located.

Figure 4:
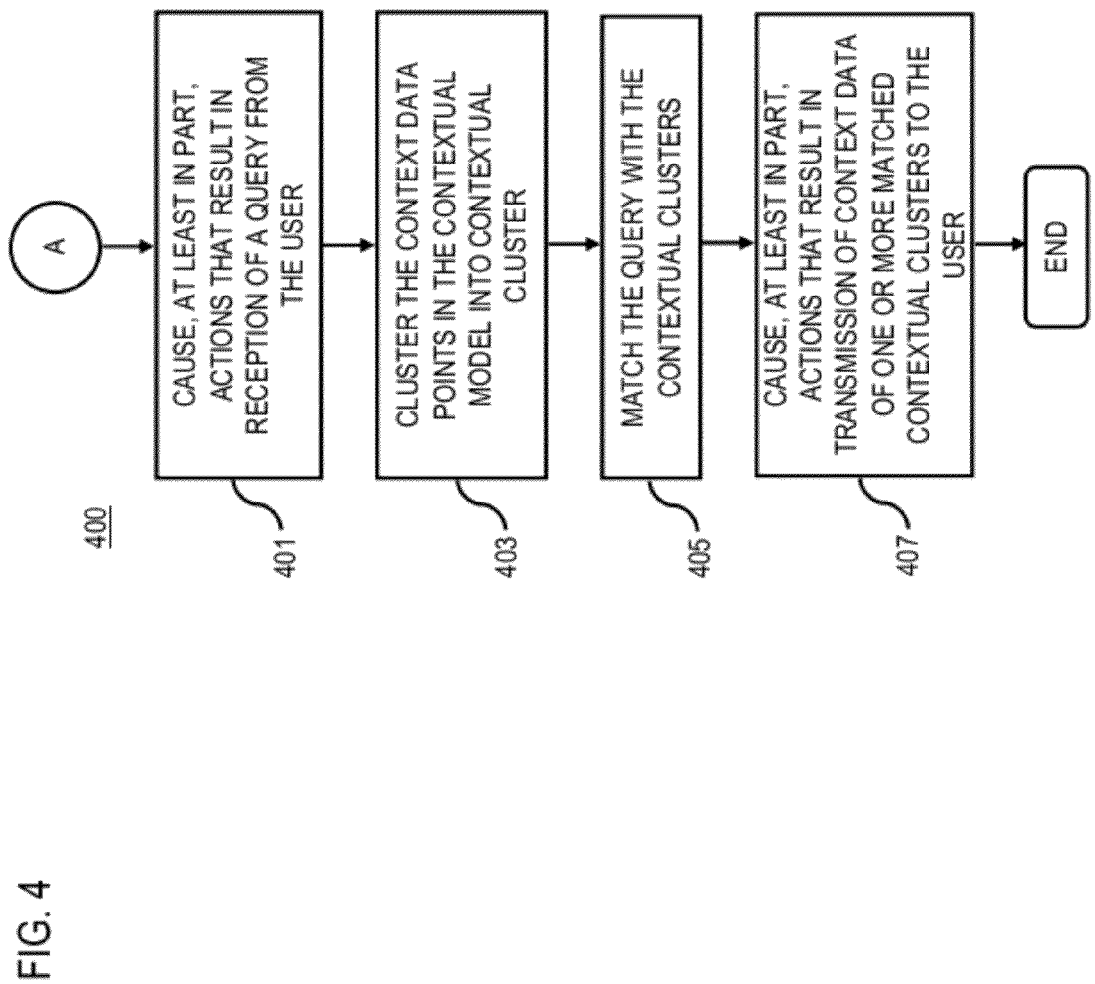
FIG. 4 is a flowchart of a process for responding to a search query, according to one embodiment.

FIG. 4 is a flowchart of a process 400 for responding to a search query, according to one embodiment. In one embodiment, the context modeling platform 103a performs the process 400 and is implemented in, for instance, a chip set including a processor and a memory as shown in FIG. 15. In step 401, the context modeling platform 103a receives a search request from the user (e.g., a nightclub in London). The context modeling platform 103a clusters data points in the contextual model 200 into contextual clusters, such as nightclubs in Europe that were searched and/or visited by the user (Step 403). The search request is optionally mapped into the contextual model 200. Step 401 and Step 403 can occur concurrently or in a reverse order. For clustering, the context modeling platform 103a selects a distance measure to determine how the similarity of two points in the model 200 is calculated. The distance measure influences the shape of the clusters, since some points may be close to one another according to one distance yet farther away from one another according to another distance.

Common distance measure functions include the Euclidean distance, the Manhattan distance, the maximum norm, the Mahalanobis distance, the Hamming distance, etc. By way of example, the context modeling platform 103a uses the Euclidean distance for clustering, since it is the most common distance measure in published studies in that research area. The Euclidean distance is the "ordinary" distance between two points that one would measure with a ruler. Consequently, contextual data points of short Euclidean distances are clustered into contextual clusters 203, 205, 207, 209, and 211 as shown in FIG. 2.

The context modeling platform 103a matches the search request with the contextual clusters (Step 405). As a response to the user request, the context modeling platform 103a sends to the user data of one or more matched contextual clusters (Step 407). For example, the cluster 203 including two salsa dance nightclubs the user searched within this month and located in downtown London, as well as the cluster 205 including three nightclubs in Cambridge with live salsa bands and visited by the user within the last six months are matched with the user's request. On the other hand, the cluster 207 including Latino dance nightclubs located in Greenwich, the cluster 209 including salsa dance nightclubs the user searched last year and located in Spain, and the cluster 211 including Latino dance classes the user searched within this year are not matched with the search request due to their long distances from the cluster 203. Therefore, the user does not need to enter keywords in the search line to find customized information, since the information is already recorded in the user context model 200 and utilized via the process 400.

In another embodiment, as an alternate approach to reduce calculation resource consumption, the context modeling platform 103*a* inserts the user request as a data point into the contextual model 200, and locates in the contextual model 200 data points including both data items of "nightclub" and "London." Each of the located data points represents one context instance of the user's online references to a nightclub and to London in an input entry, email, SMS, posting in a blog, forum, or social network webpage. The context modeling platform 103*a* then calculates a Euclidean distance between each of the located data points and the data point representing the user request, and presents to the user a predetermined number of the located data points that have short Euclidean distances to the user request data point.

In another embodiment, as an alternate approach to reduce calculation resource consumption, the context modeling platform 103*a* defines an importance of the contextual entities in the model 200 by computing statistics from transaction logs and other data sources. A concept frequently appearing in transaction logs is identified as more important than another entity appearing less frequently in the transaction logs. The context modeling platform 103*a* then includes only entities with a predetermined level of importance for clustering calculation according as discussed above.

For example, after determining Euclidean distances and matching the clusters, the context modeling platform 103*a* shows image sizes of the nightclubs on a map based on a ratio of 1 to the Euclidean distance. In certain embodiments, the size of a nightclub icon or marker on a screen is exaggerated to highlight the user's interests.

Figure 5A:
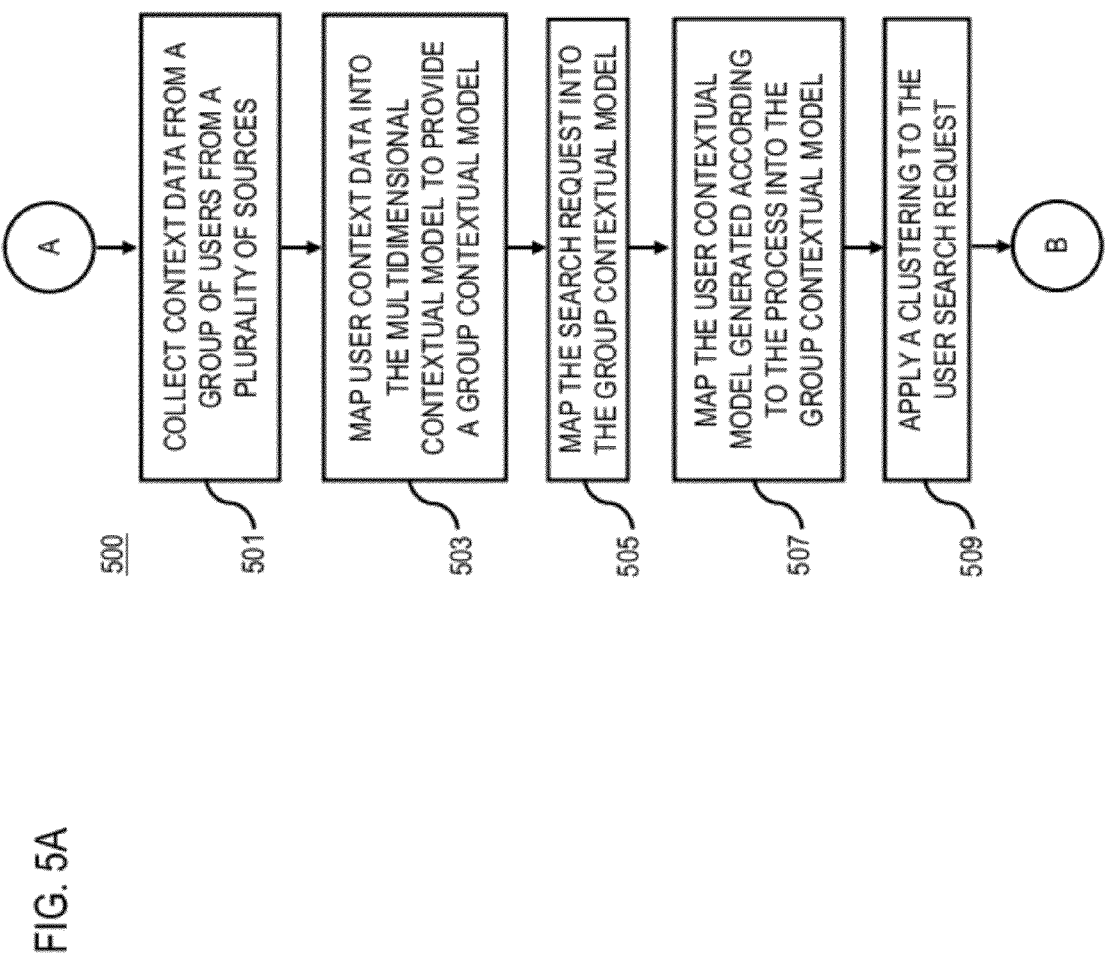
FIG. 5A is a flowchart of a process for building a group contextual model, according to one embodiment.

FIG. 5A is a flowchart of a process 500 for building a group contextual model, according to one embodiment. In one embodiment, the context modeling platform 103*a* performs the process 500 and is implemented in, for instance, a chip set including a processor and a memory as shown in FIG. 15. In step 501, the context modeling platform 103*a* collects context data from a group of users from a plurality of sources. The group can be any existing user group or a specific group defined by the user or by heuristic analysis of, for instance, the user's contacts (e.g., contacts stored on the user's mobile device, social networking contacts, etc.). The context modeling platform 103*a* maps the collected user group context data into a multidimensional contextual model to provide a group contextual model (Step 503). The context modeling platform 103*a* then maps the search request into the group contextual model (Step 505). The context modeling platform 103*a* further maps the user contextual model generated according to the process 300 into the group contextual model (Step 507). Thereafter, the context modeling platform 103*a* applies a similar clustering on the group contextual model (Step 509) as performed in the process 400, e.g., by clustering group context data points in the group contextual model into group contextual clusters (e.g., nightclubs in Europe searched and or visited by the group of users), matching the search request with the group contextual clusters, and sending to the user data of one or more matched group contextual clusters.

Figure 5B:
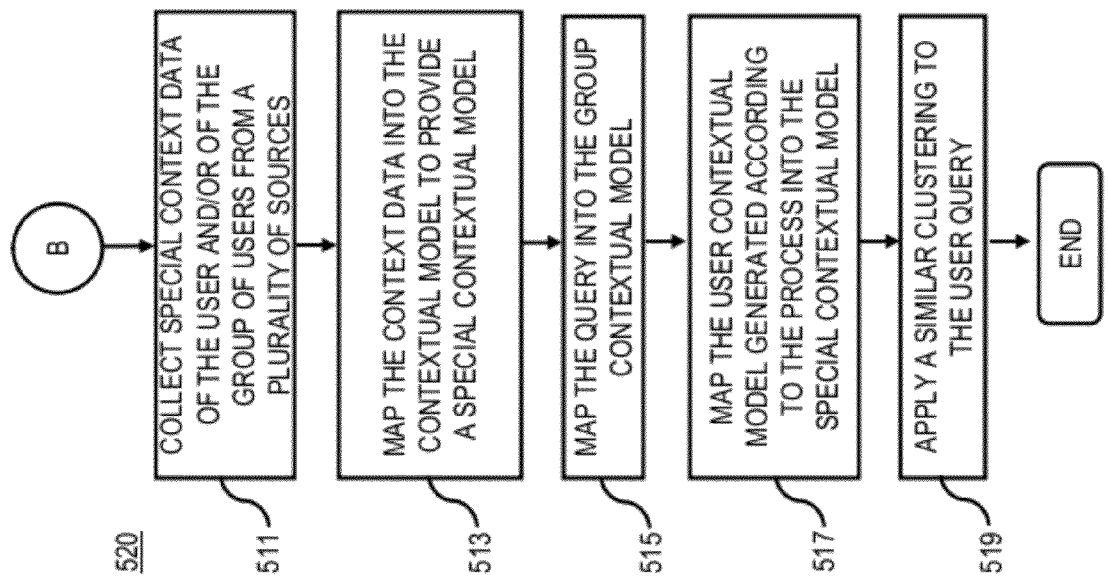
FIG. 5B is a flowchart of a process for building a location contextual model, according to one embodiment.

FIG. 5B is a flowchart of a process 520 for building a location contextual model, according to one embodiment. In step 511, the context modeling platform 103*a* collects special context data of the user and/or of the group of users from a plurality of sources. The special contact data can be any subset of data of the user context data and/or the group context data, such as location context data, personal preference data, etc. The context modeling platform 103*a* maps the context data into the contextual model to provide a special contextual model (Step 513). The context modeling platform 103*a* then maps the search request into the group contextual model (Step 515). Thereafter, the context modeling platform 103*a* maps the user contextual model generated according to the process 300 into the special contextual model (Step 517). The context modeling platform 103*a* then applies a similar clustering on the group contextual model (Step 519) as performed in the process 400, e.g., by clustering special context data points in the special contextual model into special contextual clusters, matching the search request with the special contextual clusters, and sending to the user data of one or more matched special contextual clusters.

When there are different special contextual models built for the user and/or the user group, the context modeling platform 103*a* maps the user contextual model to the most relevant special contextual model (e.g., in that particular location or region). Regardless of how the special contextual model is selected, the context modeling platform 103*a* starts to use the special contextual model to provide relevant information (e.g., on a particular location). The information is provided to the user as list of suggestions matching with the user request.

After a user, group or special contextual model is built, the context modeling platform 103*a* already has information of the user, the user group, and the user's special context as well as the relevant preferences to respond to subsequent searches conducted in a similar context. In addition, the context modeling platform 103*a* can take into account only stored concepts/entities to reduce computation load of the system. This is especially important for mobile devices with lilted capabilities.

Figure 6:
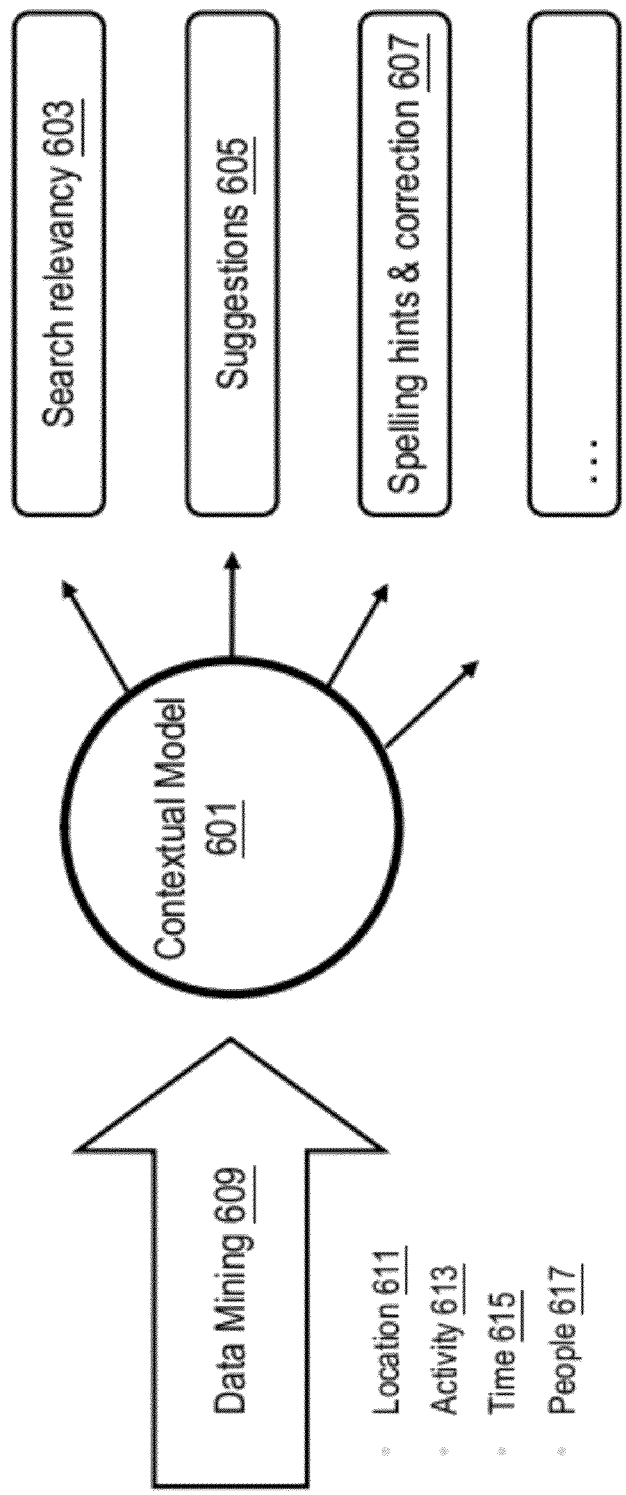
FIG. 6 is an operational diagram of a contextual model, according to one embodiment.

FIG. 6 is an operational diagram of a contextual model, according to one embodiment. Besides using the contextual models to search for relevancy of entities via clustering in a search relevancy function 603, the contextual model 601 is also used to reply to user requests for suggestions via a suggestion function 605. In one embodiment, the contextual model 601 can suggest search terms and/or correct the spelling of manually entered search terms via a spelling hints and correction function 607. For example, the user is walking along the street and wants to find a nice restaurant to have dinner. When the user starts typing, the context modeling platform 103*a* queries the contextual model 200 in order to suggest possible words the user intends to type based upon, for example, the contextual model of the user. It is very likely that the contextual models computed from past user activities reflect the actual characteristics of the user. As discussed in the various embodiments, the system 100 applies data-mining 609 based on context data of locations 611, activities 613, time 615, and people 617, etc., thereby enabling the functions 603, 605, 607, etc.

It is noted that a considerable amount of relevant user activities actually happen when user is offline (i.e., not connected into Internet). Therefore, the system 100 introduces the capabilities to record and track the offline activities, such as the user's remote access to the point of interest (e.g., a nightclub). The user's offline activities include (1) mentioning the nightclub by the user in the user's calendar appointments, (2) calling by the user inside the nightclub, voting by the user the nightclub or an establishment in the nightclub as important (e.g. "Restaurant of the year"), (3) real world media items (articles, music, video, photos, etc. posted in blogs on web pages, etc.) created by the user regarding the nightclub, (4) articles, music, video, photos, etc. captured by the user regarding the nightclub, (5) GPS data indicating the user's actual visits to the nightclub, (6) bills/receipts charged for the user's actual visits to the nightclub, etc. The context modeling platform 103a can also look for the name of the nightclub mentioned in text or audio messages created by the user. In this case, the context modeling platform 103a determines which nightclub is represented in articles, music, video, photos by looking via a GPS position and heading data in the data files. The context modeling platform 103a may conduct content analysis of the communications (e.g., text or audio messages, etc.) of the user to look for expressions of personal importance towards the nightclub, such as "I really love the Crazy Horse Saloon, I visit it as often as I can", "I take every opportunity to dine at the Crazy Horse Saloon," etc. The context modeling platform 103a may explore associations between the user and the nightclub by accessing databases storing data on where (the nightclubs) the user lives in, works in, has a membership to (e.g. a frequent flyer club, a spa), as well as databases storing data on where (the nightclubs) the user's friends or contacts live in, work in, have a membership to, etc. Preferably, the system 100 collects all raw activity information.

As mentioned, a considerable amount of user activities are performed in offline-mode. To ease user interaction with the system by providing contextually relevant assistance while under the constrains of data storage and computing power, the context modeling platform 103a further simplifies representation of the contextual models by maintaining only the most prominent parts of the contextual models, such as providing a subset of the model at an on-demand basis. For example, if the user travels to a new city, the context modeling platform 103a extracts a generalized contextual model for that particular city to be downloaded into the UE 101 when the user is online for the first time from that city. One example of this kind of generalized subset of contextual model is a dictionary which is used for word entry suggestions.

Given that users are expressing their taste in the contextual models, the context modeling platform 103a further provides for user classification or categorization of contextual data. For instance, the users are actively "tagging" locations they visit by interacting with the contextually aware system and the contextual models. With the user contextual models, the context modeling platform 103a further enhances the tagging by enforcing specific topics based on user model information.

Figure 7:
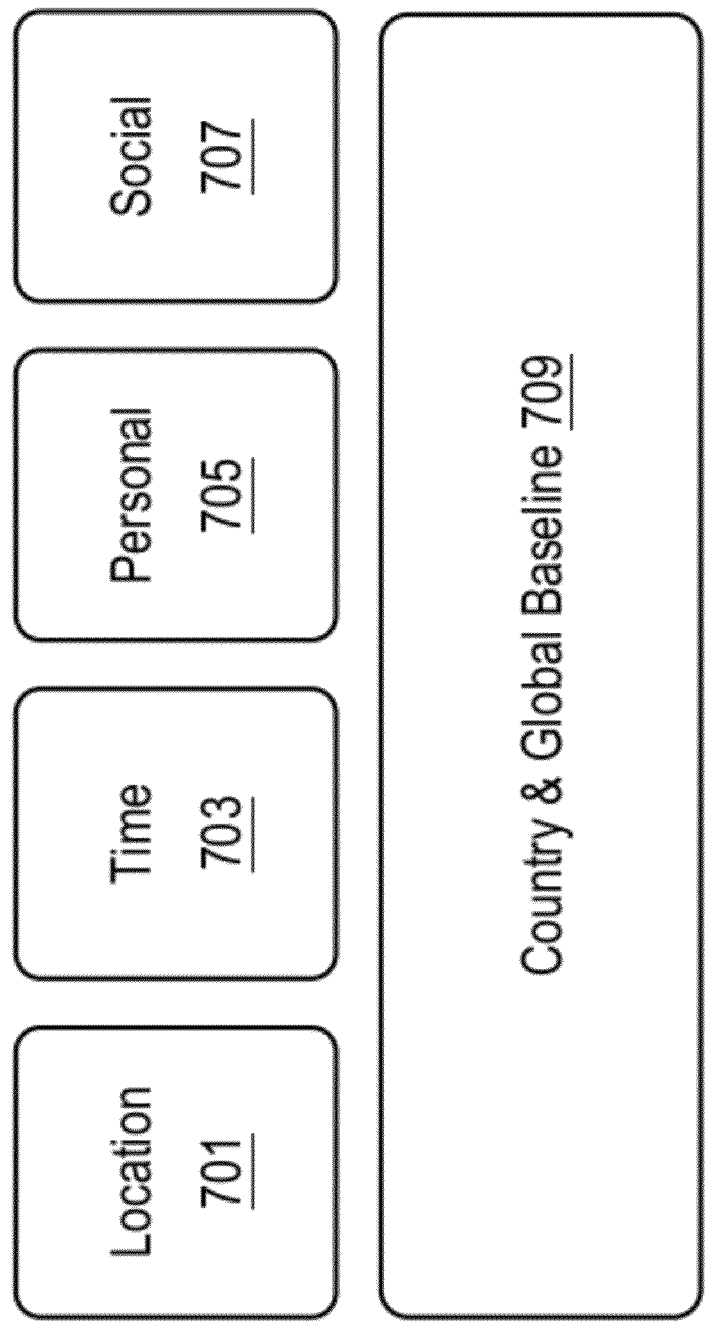
FIG. 7 is a diagram of an architecture of a local contextual function, according to one embodiment.

FIG. 7 is a diagram of an architecture of a local contextual function, according to one embodiment. In this embodiment, the contextual model 700 further includes a country and global baseline 709 to supplement the four dimensions of the contextual model 700 as discussed previously such as the location dimension 701, the time dimension 703, the personal dimension 705, and the social dimension 707. For example, the context modeling platform 103a uses at least the context data in the country level and the global search history data to form a baseline in the contextual model 700. The context modeling platform 103a then uses the contextual models to identify locally important or relevant topics, thereby discovering significant differences for certain local areas by data mining.

Figure 8:
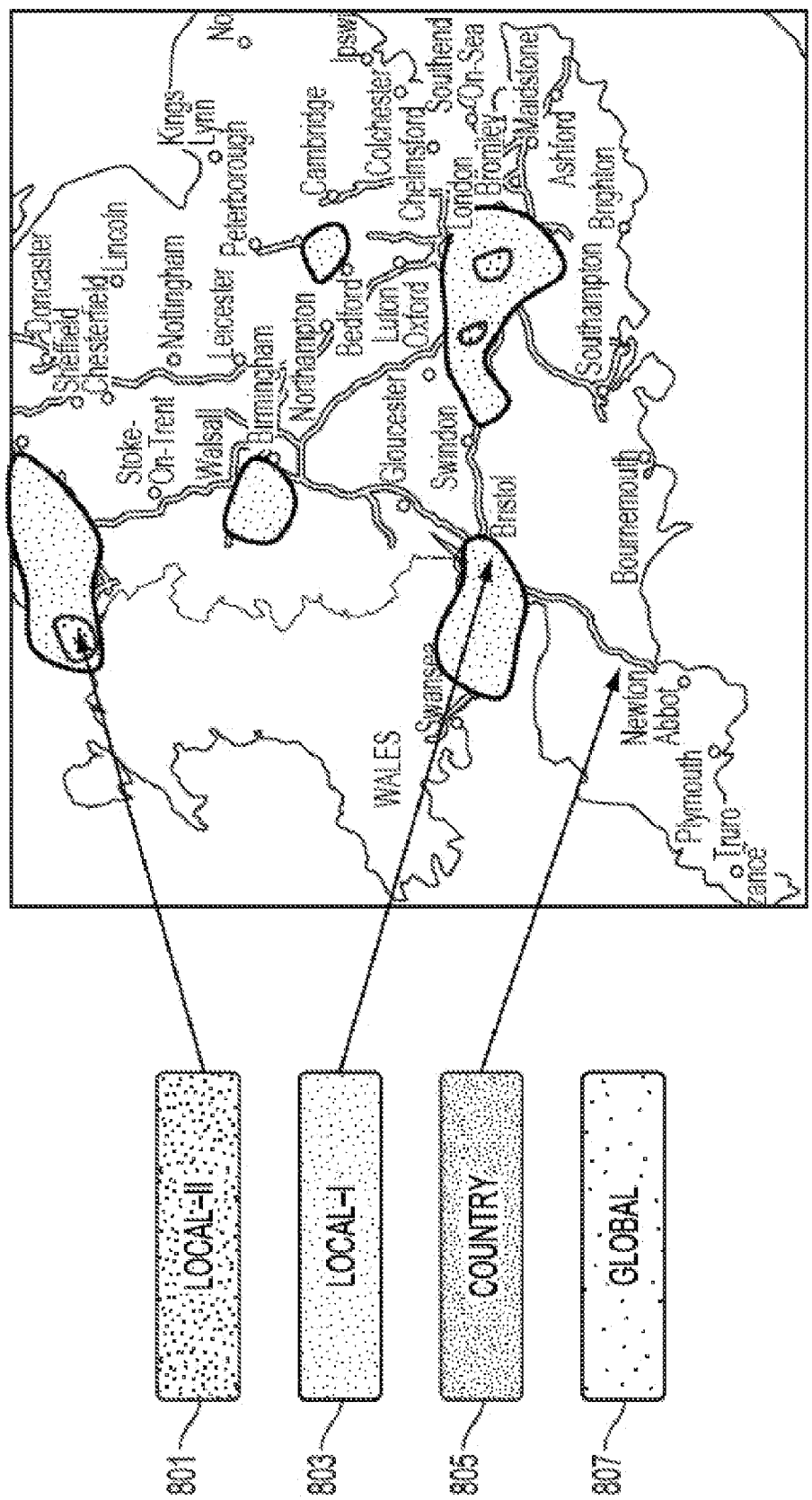
FIG. 8 is a diagram including four levels of location context, according to one embodiment.

FIG. 8 is a diagram including four levels of location context, according to one embodiment. By way of example, search requests and search results can be significantly different from one location level to the next level. In this embodiment, a local-II level 801 refers to the City of Liverpool, a local-I level 803 refers to the City of Cardiff and the City of Bristol, a country level 805 refers to the United Kingdom, and a global level refers to the earth. The local-II level 801 and the local-I level 803 are discovered through data mining. Therefore, this embodiment enables the user to view information outside of any pre-defined geographic scale set by others (e.g., search engines, service providers, etc.). Meanwhile, this embodiment enables the user to view information outside of their restrains set by graphical area and/or personal knowledge.

This embodiment highlights locally unique data, while providing data from country and global levels. In particular, the context modeling platform 103a identifies locally searched topics from transaction logs and tagging relevant contextual entities in the model as local entities. Likewise the locally searched topics can be tagged as global entities in the contextual model. Preferably, there are several levels of tags from global to local: Global, Continent, Country, City, District, etc., and the levels are implemented to provide portable and smooth transitions.

Figure 9:
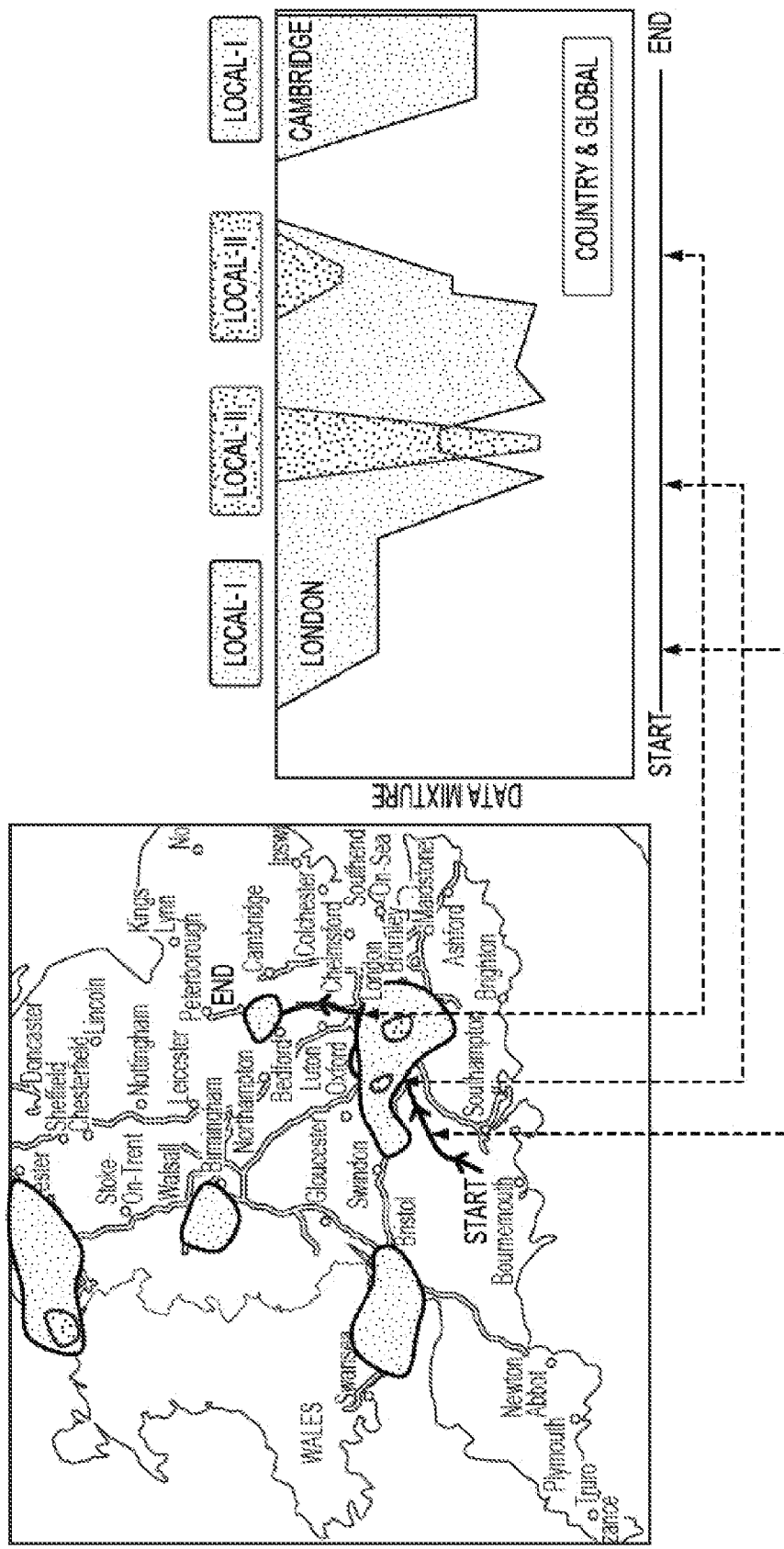
FIG. 9 is a diagram illustrating traversal of a contextual model, according to on embodiment.

The user can not only include the search/usage history of users (and/or like-minded users) at one location (e.g., Cambridge), but also blend in search/usage history of users (and/or like-minded users) in nearby locations or locations on a navigation route. FIG. 9 is a diagram shows how to traverse the contextual model, according to on embodiment. In particular, the context modeling platform 103a traverses the contextual model based upon the contextual model of FIG. 7 of locations on a navigation route. For example, in response to a search query of "homemade ice cream" after the user enter a travel route between Southampton (starting location) and Cambridge (end location), the context modeling platform 103a mixes the local center context data with global history baseline based upon the user's selections of the location I and II, automatically builds a special local contextual model, maps the query and the route into the contextual model, and finds the most relevant data the user is looking based upon distances form the local centers. Consequently, the context modeling platform 103a determines an ice cream shop as the most visited homemade ice cream shop by the user and/or by a group users between Southampton and Cambridge on or near the navigation route based upon the search/usage history of users at selected two locations I (e.g., London and Cambridge) and two locations II (e.g., Reading and Broley) on the route. The contextual model for the user may be used to keep track on user preferences for global and/or local entities.

Geographical location is just one dimension in the multi-dimensional context model. It is possible that two different cities have a significantly far geographical distance between them even though these two cities are in close proximity in the multidimensional model, i.e. similar in user context data (e.g., usage history).

In another embodiment, the context modeling platform 103a weights the user activity entities differently in the user contextual model. If the user is always searching and acting in a local scope, the context modeling platform 103a ranks local information with a higher weighing than global information. Similarly, if the user is always active in a global context, the context modeling platform 103a weights the global information higher than the local information. The weightings may also be defined by a user based upon the content of the query. For example, the city paper or magazine publishes the top 100 restaurants in the city. The context modeling platform 103a enables the user to dynamically and flexibly customize the information by including evaluation by the consumers (and/ or consumers of like mind) of certain locations in the city and/or in neighboring street/town/city/county/country (not limited by the city border selected by the paper or magazine). In addition, the context modeling platform 103a allows the user to set the weightings or use some default weightings (e.g., by distance) to include the search/usage history of users (optionally, of different social groups) at different locations in the search. Using the same query of ice cream as an example, the most visited homemade ice cream shop is located less than 2 miles detour from a navigation route based upon the search/usage history of users at London, Cambridge, Reading and Broley, when the user sets the distance of 2 miles from the route with a high weighting.

FIGS. 10A-10B are diagrams of an example of how context data of different location levels are adjusted, according to one embodiment. As shown in FIG. 10A, when the user selects a populated area in a major city which has a big population and high internet usage, there is sufficient user context data available for building a contextual model. The context modeling platform 103a can get highly relevant suggestions for specific contexts, e.g., establishments on a street, a group with certain preferences during certain time of a day, etc. If the user selects a rural area which has a small population and low internet usage, there is limited user context data available for building a contextual model. In this case, the context modeling platform 103a uses more search functionalities to compensate for the user context data.

Figure 11A:
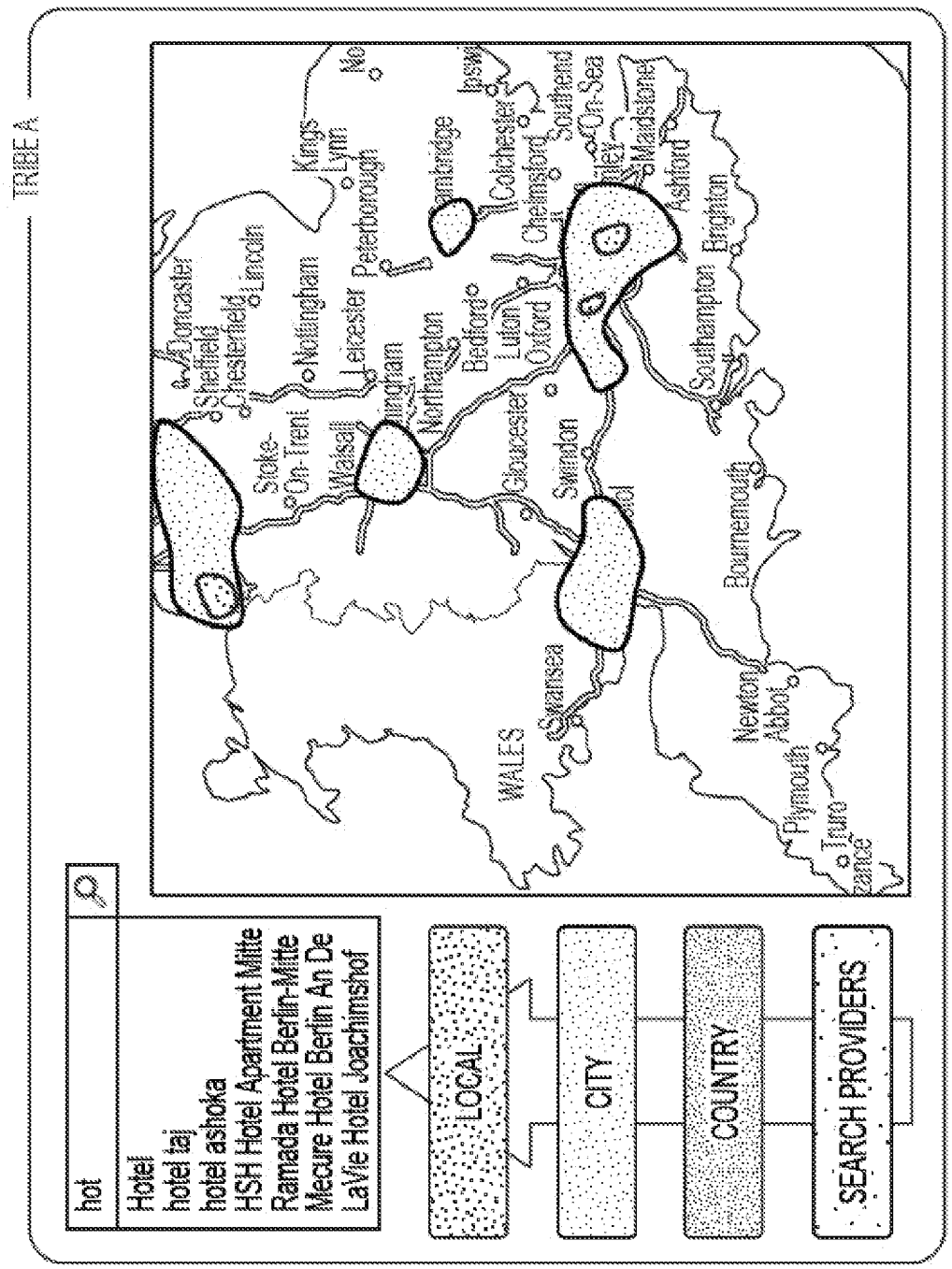
FIGS. 11A-11B are diagrams of two respective tribes, according to various embodiment.
Figure 11B:
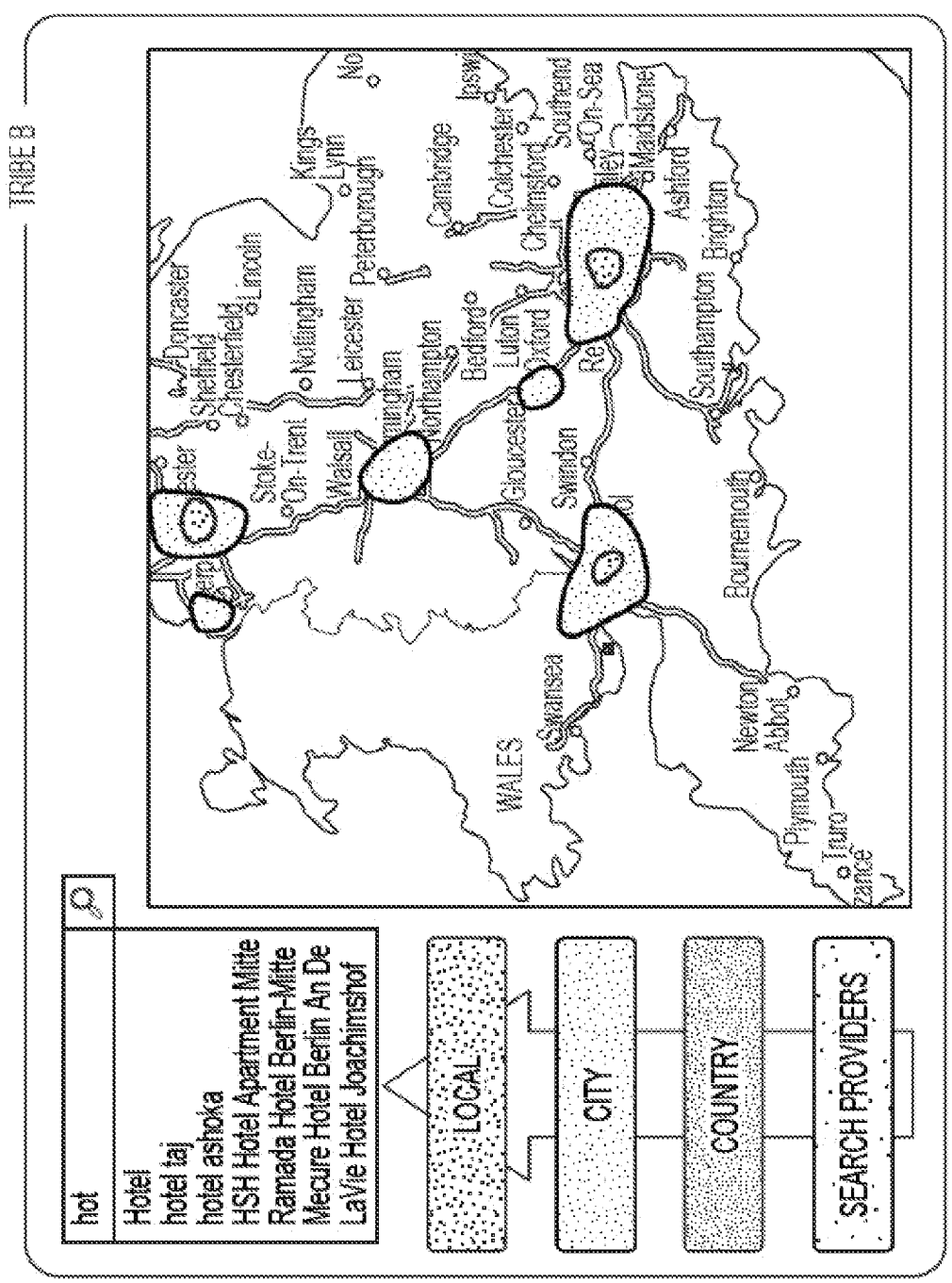

FIGS. 11A-11B are diagrams of two respective tribes, according to various embodiments. A tribe is a group of users that behave in a similar manner online and/or with similar personal taste. The users of a tribe A in FIG. 11A prefer Hotel TAJ, Hotel Ashoka, etc. The users of a tribe B in FIG. 11B prefer some hotels in common with the ones the user of the Tribe A prefer. However, the users of the Tribe B have the hotels listed with a different preference order, such as HSH Hotel Apartments Mitte, Ramada Hotel Berlin Mitte, etc.

The user is not typically aware of a tribe, but the context modeling platform 103a uses the context model to observe tribes and suggests to the user more relevant results/suggestions/etc. The context modeling platform 103a also suggests tribe parameters for the user to define a new tribe for collecting specific information as discussed, if the user does not want to use already defined tribes or social groups. To provide personalized suggestions, the context modeling platform 103a calculates each tribe's search history data separately. In case there is not enough tribe specific data, the context modeling platform 103a reverts to use generic behaviors of the users.

Figure 12:
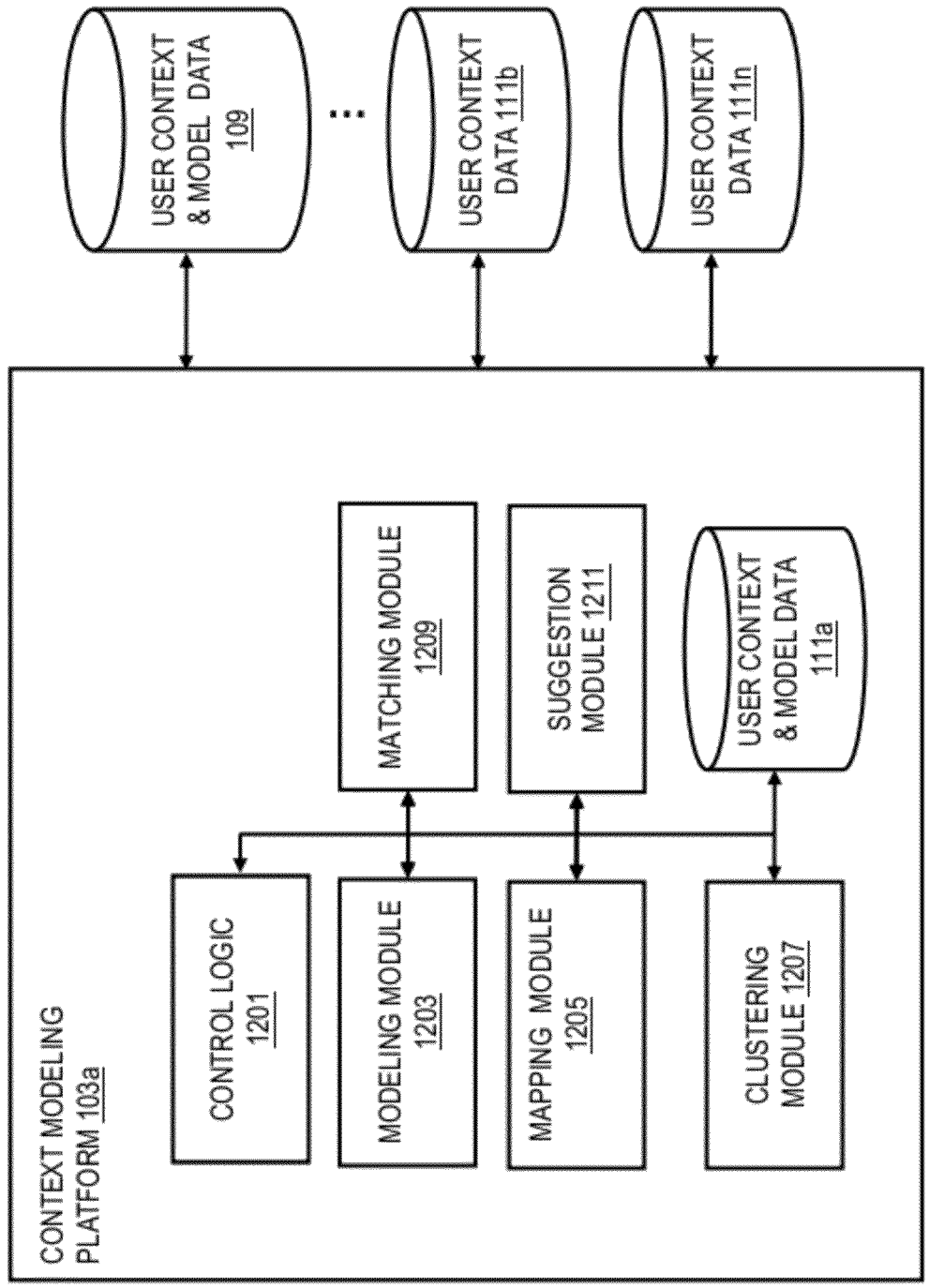
FIG. 12 is a diagram of the components of a context modeling platform, according to one embodiment.

FIG. 12 is a diagram of the components of the context modeling platform 103a, according to one embodiment. By way of example, the context modeling platform 103a includes one or more components for providing a contextual model based upon user context data. It is contemplated that the functions of these components may be combined in one or more components or performed by other components of equivalent functionality. In this embodiment, the context modeling platform 103a includes at least a control logic 1201 which executes at least one algorithm for executing functions of the context modeling platform 103a. The context modeling platform 103a includes a modeling module 1203 for building the user, group and special contextual models according to various embodiments. For building up each of the contextual models, the modeling module 1203 collects context data of a user, group, or special focus from a plurality of sources. The sources include at least online activities of the user. The context modeling platform 103a then maps the collected context data as context data points into a multidimensional contextual model.

The context modeling platform 103a also includes a mapping module 1205 for mapping the query into each of the contextual models. The mapping module 1205 also maps the user contextual model into the group and special contextual models respectively. The context modeling platform 103a also includes a clustering module 1207 for clustering context data points in each of the contextual models respectively into contextual clusters, and a matching module 1209 for matching the query with the user, group and special contextual clusters respectively.

The context modeling platform 103a further includes a suggestion module 1211 for suggesting a possible word or a possible spelling correction of the word when the user is entering a query. In particular, the suggestion module 1211 causes, at least in part, actions that result in reception of a partial entry from the user, queries the contextual clusters for a suggestion of a possible word as being entered or for a correct word as entry based upon the partial entry, and then presents to the user the possible word or the correct word.

Alternatively, the functions of the context modeling platform 103a can be implemented via a context modeling application (e.g., a widget) 107 in the user equipment 101 according to another embodiment. Widgets are light-weight applications, and provide a convenient means for presenting information and accessing services. It is contemplated that the functions of these components may be combined in one or more components or performed by other components of equivalent functionality. In this embodiment, the access control application 107 includes modules similar to those of the context modeling platform 103a, as previously described. To avoid data transmission costs as well as save time and battery, its control logic can fetch map and/or user interest data cached or stored in its own database, without requesting data from any servers or external platforms, such as the context modeling platform 103a, the web service platform 103b and the communication platform 103n. Usually, if the user equipment is online, data queries are made to online search server backends, and once the device is offline, searches are made to offline indexes locally.

Figure 13:
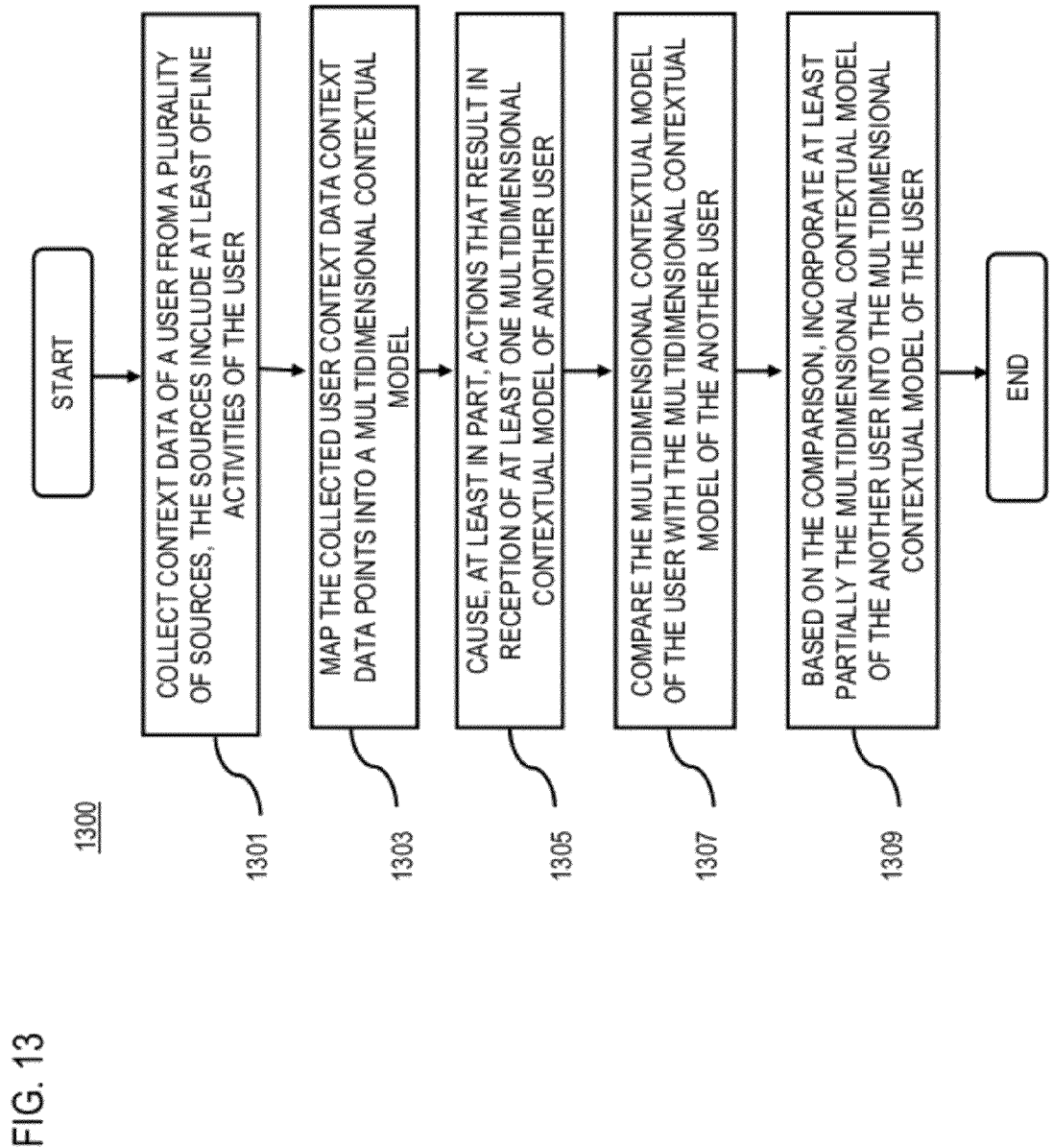
FIG. 13 is a flowchart of a process for providing an offline contextual model, according to one embodiment.

FIG. 13 is a flowchart of a process 1300 for providing an offline contextual model, according to one embodiment. In one embodiment, the application 107 or the platform 103a performs the process 1300 and is implemented in, for instance, a chip set including a processor and a memory as shown in FIG. 15. In step 1301, the application 107 or the platform 103a collects context data on offline activities of a user. The application 107 or the platform 103a monitors offline activities to create an offline profile or contextual model of the user to quickly customize the usage experience of the UE 101 when the UE 101 transitions from an offline state to an online state. More specifically, by first monitoring offline activities, the application 107 or the platform 103 can immediately begin building the contextual model for the UE 101 without collecting online history of the user's activities. The offline activities can be automatically monitored by the UE 101 (e.g., mentioning a facility in the user's calendar appointments, calling by the user inside a facility, etc.), or disclosed by the user via surveys and/or other kinds of information sources. By way of example, the user's offline activities may include data mining information sources including, for instance: (1) the user's calendar appointments, (2) the user's calling records, (3) real world media items created by the user, (4) GPS data or other location information indicating the user's actual visits, (5) bills charged for the user's actual visits, and the like. The application 107 or the platform 103a maps offline user context data as context data points into a multidimensional contextual model (Step 1303).

Once the UE 101 is online, the application 107 or the platform 103a causes, at least in part, actions that result in reception of at least one multidimensional contextual model of another user (Step 1305). The application 107 or the platform 103a compares the offline contextual model of the UE 101 with the contextual models of other UEs (Step 1307), to determine if the user and another user have like minds and/or similar behaviors. In particular, the application 107 or the platform 103a clusters the context data points of each of the contextual models respectively into a plurality of data sets based a correlation among data points within each of the data sets. The clustering, for instance, enables the application 107 or the platform 103a to more easily relate the data sets to specific sets or combinations of usage experience. The number of data sets (e.g., 20) to be clustered may be pre-defined or determined automatically by the application 107 or the platform 103a.

By way of example, the data points are clustered by determining correlation among the data points through Euclidean distances, LDA, probabilistic latent semantic analysis (PLSA), or other clustering algorithms. Several iterations of the algorithm may be executed over the data points to get as refined a grouping of data sets as wanted. Once the data points are clustered into data sets, the application 107 or the platform 103a determines one or more tags (i.e., most significant or representative data points) per data set based upon a language model pertaining to pre-defined usage categories or classes (such as hobbies including clubbing, hiking, etc.), by matching tags in each tag set against the language model. The application 107 or the platform 103a then compares the contextual model of the user with the contextual model of another user (e.g., per tag or per data set), to determine if the user and the other user have like mind and/or similar behaviors.

The calculated matching or correlation probabilities enable the application 107 or the platform 103a to evaluate, for instance, the relative accuracy or appropriateness of incorporating the contextual model of the another user into the contextual model of the user, thereby determining a degree of incorporating of one contextual model into the other contextual model. The application 107 or the platform 103a incorporates entirely or partially (e.g., per tag or per data set) the contextual model of the another user into the contextual model of the user (Step 1309). In this way, the offline contextual model of the user can be enriched with context data from other like-minded and/or similarly behaving users. In another embodiment, application 107 or the platform 103a groups users of like minds or similar behaviors to create one or more user groups.

The application 107 or the platform 103a also builds group and special contextual models according to various embodiments. For building up each of the contextual models, the application 107 or the platform 103a collects context data of a group or special focus from a plurality of sources. The sources include at least offline activities of the user. The application 107 or the platform 103a then maps the collected context data as context data points into a multidimensional contextual model as discussed previously in conjunction with online activities of the user.

The application 107 or the platform 103a maps the query into each of the contextual models. The application 107 or the platform 103a also maps the user contextual model into the group and special contextual models respectively. The application 107 or the platform 103a further clusters context data points in each of the contextual models respectively into contextual clusters, and matches the query with the user, group and special contextual clusters respectively.

The application 107 or the platform 103a further suggests a possible word or a possible spelling correction of the word when the user is entering a query. In particular, the application 107 or the platform 103a causes, at least in part, actions that result in reception of a partial entry from the user, queries the contextual clusters for a suggestion of a possible word as being entered or for a correct word as entry based upon the partial entry, and then presents to the user the possible word or the correct word.

It is noted that conventional consumer/user ratings give substantially equal or fixed weight to all users and all locations. On the other hand, the context modeling platform 103a suggests search results more relevant to the geographic locations as well as to interests of social groups in the relevant geographic locations. These features are useful in searching/suggesting locally unique data, regardless restrictions built-in the existing categorized/grouped information.

The processes described herein for providing a contextual model based upon user context data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
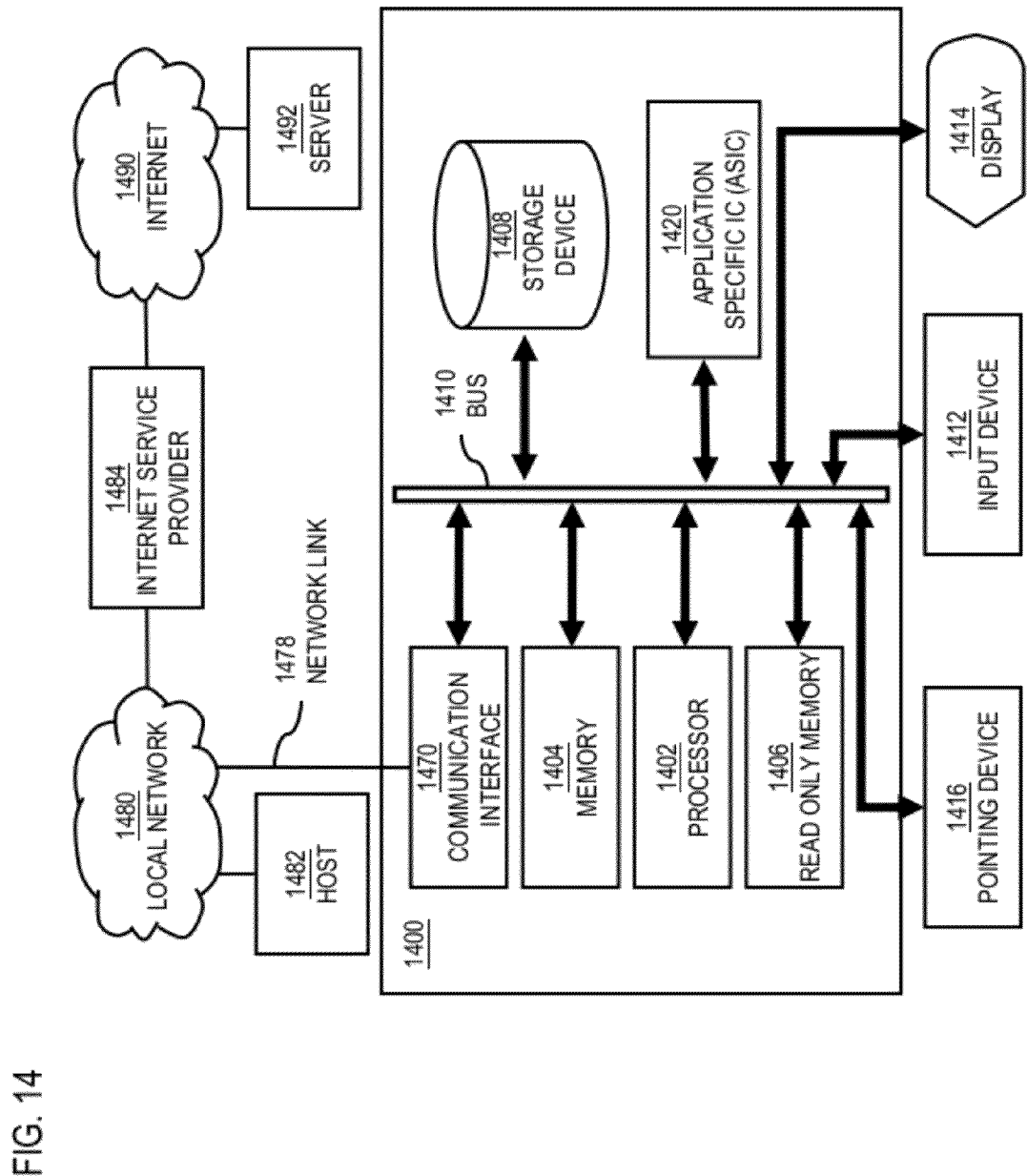
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to provide a contextual model based upon user context data as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of providing a contextual model based upon user context data.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to provide a contextual model based upon user context data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing a contextual model based upon user context data. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing a contextual model based upon user context data, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection between the UE 101 and the communication network 105 for providing a contextual model based upon user context data.

The term "computer-readable medium" as used herein to refer to any medium that participates in providing information to processor 1402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set 1500 upon which an embodiment of the invention may be implemented. Chip set 1500 is programmed to provide a contextual model based upon user context data as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of providing a contextual model based upon user context data.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide a contextual model based upon user context data. The memory 1505 also stores the data associated with or generated by the execution of the inventive steps.

Figure 16:
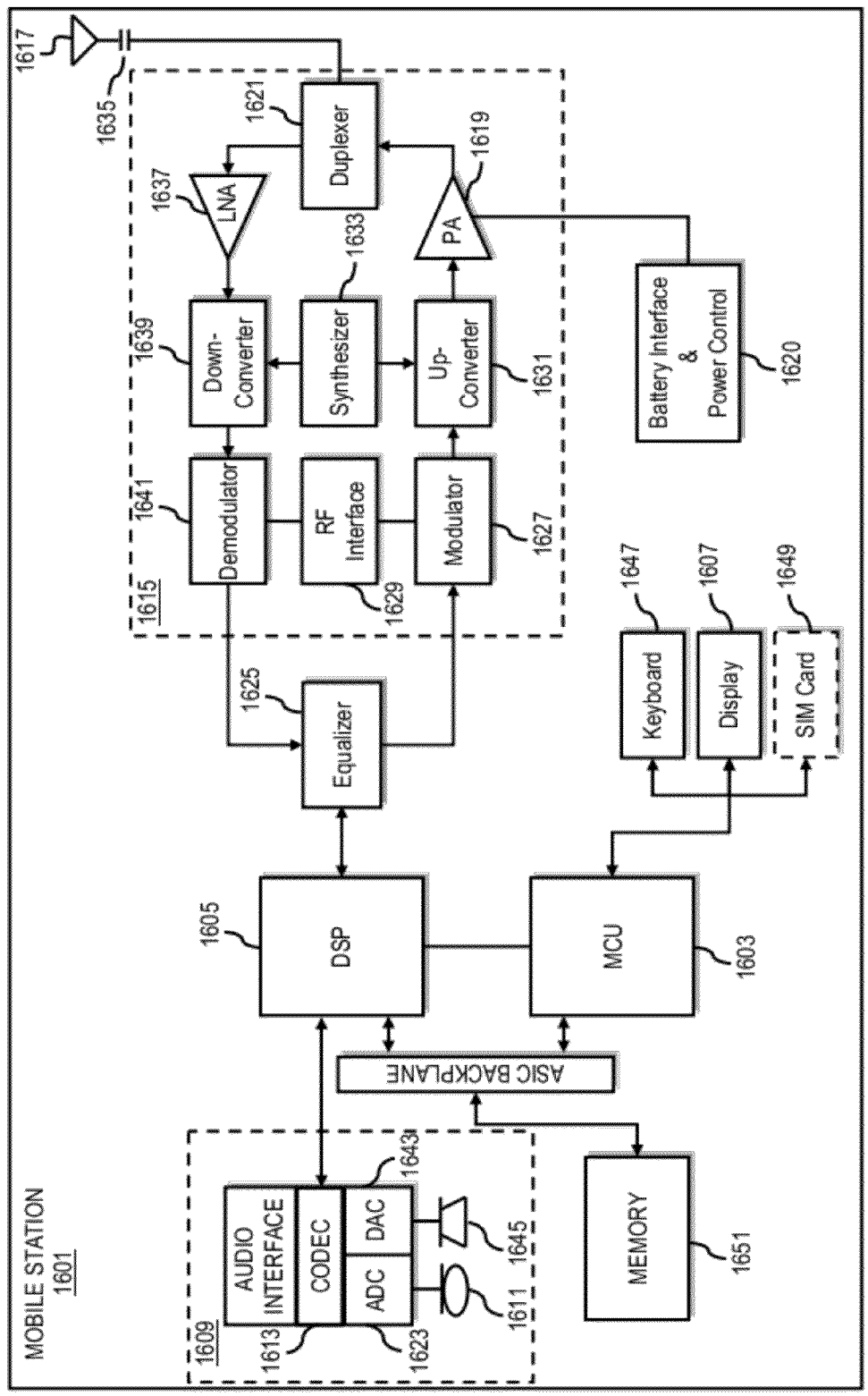
FIG. 16 is a diagram of a mobile terminal (e.g., a handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1600, or a portion thereof, constitutes a means for performing one or more steps of providing a contextual model based upon user context data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile terminal functions that perform or support the steps of providing a contextual model based upon user context data. The display 16 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to provide a contextual model based upon user context data. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   tracking the offline activities of a user by data-mining at least one of: the user's calendar appointments, the user's calling records, real world media items created by the user, GPS data indicating the user's actual visits, and bills charged for the user's actual visits;
   collecting context data on the offline activities of the user using the tracked offline activities;
   mapping the collected context data as context data points into a multidimensional contextual model;
   causing, at least in part, actions that result in reception of at least one multidimensional contextual model of another user; and
   comparing the multidimensional contextual model of the user with the multidimensional contextual model of the another user.

2. An apparatus comprising:
   at least one processor; and
   at least one memory including computer program code,
   wherein the at least one memory and the computer program code configured to, with the at least one processor, cause the apparatus to perform at least the following:
   track the offline activities of a user by data-mining at least one of: the user's calendar appointments, the user's calling records, real world media items created by the user, GPS data indicating the user's actual visits, and bills charged for the user's actual visits;
   collect context data on the offline activities of the user using the tracked offline activities;
   map the collected context data as context data points into a multidimensional contextual model;
   cause, at least in part, actions that result in reception of at least one multidimensional contextual model of another user; and
   compare the multidimensional contextual model of the user with the multidimensional contextual model of the another user.

3. A computer-readable storage medium carrying one or more sequences of one or more instructions which, when executed by one or more processors, cause an apparatus to perform at least the following:
   tracking the offline activities of the user by data-mining at least one of: the user's calendar appointments, the user's calling records, real world media items created by the user, GPS data indicating the user's actual visits, and bills charged for the user's actual visits;
   collecting context data on the offline activities of the user using the tracked offline activities;
   mapping the collected context data as context data points into a multidimensional contextual model;
   causing, at least in part, actions that result in reception of at least one multidimensional contextual model of another user; and
   comparing the multidimensional contextual model of the user with the multidimensional contextual model of the another user.

4. The method of claim 1, further comprising:
   based on the comparison, incorporating, at least partially, the multidimensional contextual model of the another user into the multidimensional contextual model of the user.

5. The method of claim 1, further comprising:
   causing, at least in part, actions that result in reception of a query from the user;
   clustering the context data points in the contextual model into contextual clusters;
   matching the query with the contextual clusters; and
   causing, at least in part, actions that result in transmission of context data of one or more matched contextual clusters to the user.

6. An apparatus of claim 2, wherein the apparatus is further caused to:
   based on the comparison, incorporate, at least partially, the multidimensional contextual model of the another user into the multidimensional contextual model of the user.

7. An apparatus of claim 2, wherein the apparatus is further caused to:
   cause, at least in part, actions that result in reception of a query from the user;
   cluster the context data points in the contextual model into contextual clusters;
   match the query with the contextual clusters; and
   cause, at least in part, actions that result in transmission of context data of one or more matched contextual clusters to the user.

8. A computer-readable storage medium of claim 3, wherein the apparatus is caused to further perform:
   based on the comparison, incorporating, at least partially, the multidimensional contextual model of the another user into the multidimensional contextual model of the user.

9. A computer-readable storage medium of claim 3, wherein the apparatus is caused to further perform:
   causing, at least in part, actions that result in reception of a query from the user;
   clustering the context data points in the contextual model into contextual clusters;
   matching the query with the contextual clusters; and
   causing, at least in part, actions that result in transmission of context data of one or more matched contextual clusters to the user.

10. The method of claim 4, further comprising:
    forming a user group including at least the user and the another user based on the comparison.

11. The method of claim 4, further comprising:
    respectively clustering the context data points in each of the contextual models into contextual clusters; and
    comparing the contextual clusters of the contextual models and determining a degree of incorporating of the contextual model of the another user into the contextual model of the user.

12. An apparatus of claim 6, wherein the apparatus is further caused to:
form a user group including at least the user and the another user based on the comparison.

13. An apparatus of claim 6, wherein the apparatus is further caused to:
respectively cluster the context data points in each of the contextual models into contextual clusters; and
compare the contextual clusters of the contextual models and determining a degree of incorporating of the contextual model of the another user into the contextual model of the user.

14. A computer-readable storage medium of claim 8, wherein the apparatus is caused to further perform:
forming a user group including at least the user and the another user based on the comparison.

15. A computer-readable storage medium of claim 8, wherein the apparatus is caused to further perform:
respectively clustering the context data points in each of the contextual models into contextual clusters; and
comparing the contextual clusters of the contextual models and determining a degree of incorporating of the contextual model of the another user into the contextual model of the user.

16. The method of claim 10, further comprising:
collecting context data of the user group from a plurality of sources;
mapping the collected user group context data into a multidimensional group contextual model;
clustering group context data points in the group contextual model into group contextual clusters;
matching a query with the group contextual clusters; and
causing, at least in part, actions that result in transmission of group context data of one or more matched group contextual clusters to the user.

17. An apparatus of claim 12, wherein the apparatus is further caused to:
collect context data of the user group from a plurality of sources;
map the collected user group context data into a multidimensional group contextual model;
clustering group context data points in the group contextual model into group contextual clusters;
match a query with the group contextual clusters; and
cause, at least in part, actions that result in transmission of group context data of one or more matched group contextual clusters to the user.

\* \* \* \* \*